(12) United States Patent
Yoshida et al.

(10) Patent No.: US 7,453,582 B2
(45) Date of Patent: Nov. 18, 2008

(54) POSITION DETECTION SYSTEM (75) Inventors: Satoru Yoshida, Tokyo (JP); Tetsuya Ito, Tokyo (JP); Masakatsu Watanabe, Tokyo (JP); Satoshi Ueda, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 12/021,038

(22) Filed: Jan. 28, 2008

(65) Prior Publication Data
US 2008/0165342 A1    Jul. 10, 2008

Related U.S. Application Data (63) Continuation of application No. PCT/JP2006/313818, filed on Jul. 12, 2006.

(51) Int. Cl.
*G01B 11/14* (2006.01)
(52) U.S. Cl. .............................. 356/614; 463/51; 463/53
(58) Field of Classification Search .................. 356/614
See application file for complete search history.

(56) References Cited

U.S. PATENT DOCUMENTS 5,328,190 A * 7/1994 Dart et al. ................... 273/358
6,339,748 B1   1/2002 Hiramatsu
6,962,532 B2  11/2005 Hasebe et al.
7,202,860 B2 *  4/2007 Ogawa ........................ 345/175
2003/0027613 A1   2/2003 Hasebe et al.
2004/0041786 A1 *  3/2004 Inoue et al. ................. 345/156

FOREIGN PATENT DOCUMENTS

| JP | S59-006078 A | 1/1984 |
| JP | H09-229623 A | 9/1997 |
| JP | H11-224160 A | 8/1999 |
| JP | 2000-148375 A | 5/2000 |
| JP | 2001-350576 A | 12/2001 |
| JP | 2004-101317 A | 4/2004 |
| TW | 539568 B | 7/2003 |
| TW | 200510040 A | 3/2005 |
| TW | 1235308 | 7/2005 |

* cited by examiner

*Primary Examiner*—Roy M Punnoose
(74) *Attorney, Agent, or Firm*—Global IP Counselors, LLP (57) ABSTRACT Positions of a plurality of objects in a space are detected. A position of reflected light of an object passing through an infrared screen is specified by analyzing an image obtained by selectively imaging the infrared rays. When the infrared screen is formed in front the display, reflected light is only caused just in front of the display. When the infrared rays are selectively imaged, a picture displayed with visible light is separated from reflected light in the infrared region, and only the reflected light can be imaged. A position of the reflected light on the display can be specified by a publicly known image analysis technique.

10 Claims, 9 Drawing Sheets

Prior Art

Fig. 10

POSITION DETECTION SYSTEM

CROSS-REFERENCE TO RELATED APPLICATIONS

This application is a continuation application of International Patent Application number PCT/JP2006/313818 filed on Jul. 12, 2006, which claims priority to Japanese patent application number JP2005-218132, filed on Jul. 28, 2005. The entire disclosure of International Patent Application number PCT/JP2006/313818 is hereby incorporated herein by reference.

BACKGROUND OF THE INVENTION

1. Field of the Invention

The present invention relates to a system for detecting a position of an object. More specifically, the present invention relates to a system for detecting a position of an object on a given plane in a space.

2. Background Art

There is a game in which collision detection for detecting collision of a real object that a player operates in a real space with a virtual object in a game space is performed. There is a game in which a player hits a ball at a virtual object that is displayed on a display as one kind of game of this sort.

Figure 10:
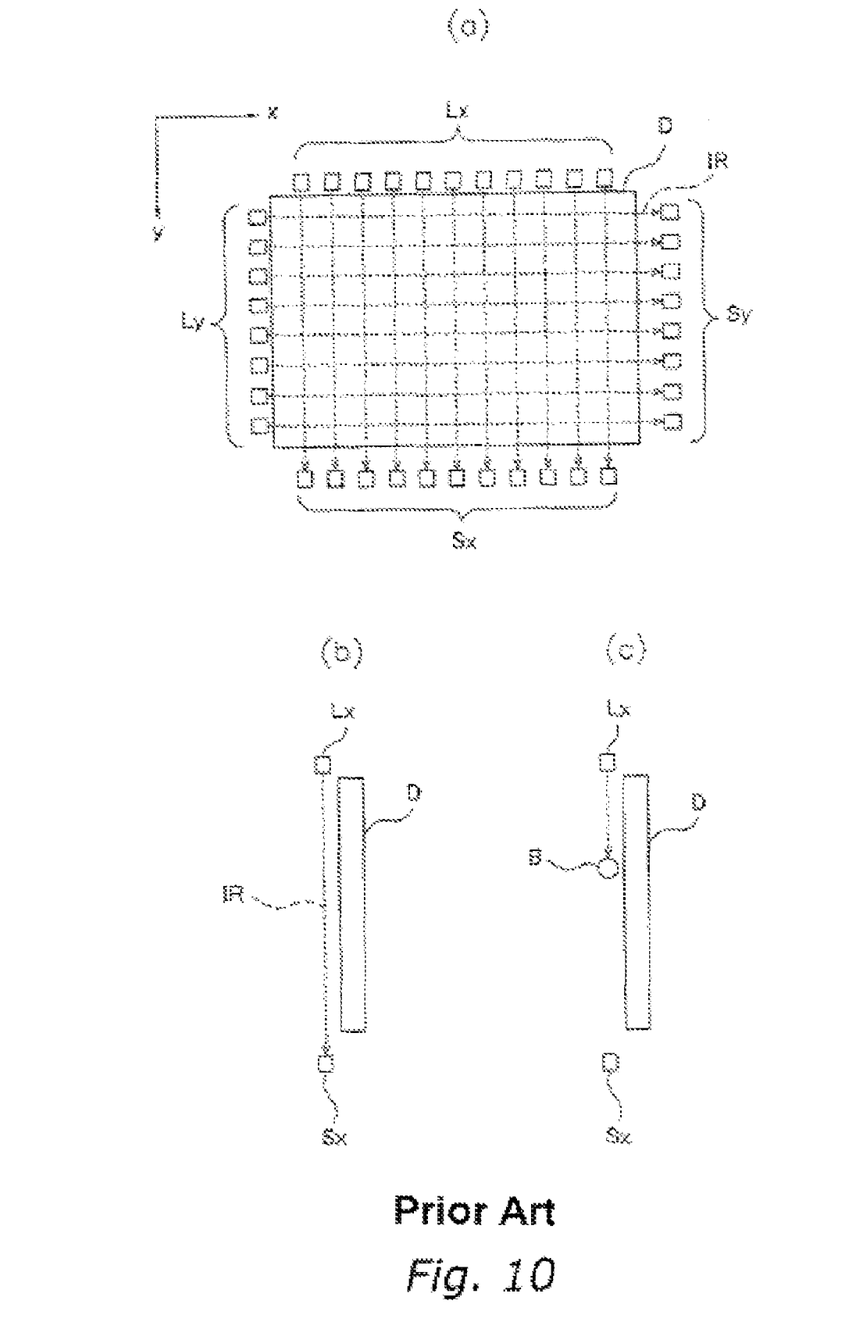
FIG. 10 is an explanatory diagram showing a conventional configuration of position detection of a ball.

FIG. 10 is an explanatory diagram showing a configuration for detecting a position of a ball in such a game. FIG. 10A shows that infrared rays irradiation means Lx and Ly are arranged along the periphery of a display D, which form a net of infrared rays in a grid. Facing the infrared rays irradiation means Lx and Ly are infrared sensors Sx and Sy which are arranged along the periphery of the display D. FIG. 10B shows that the infrared rays irradiation means Lx and Ly and the infrared sensors Sx and Sy are arranged very close to the display D. When a ball that a player threw at the display D blocks the infrared rays in front of the display D, the infrared sensors Sx and Sy detect that the infrared rays have been blocked. A position at which the ball hit is specified by an X-Y coordinate by determining which infrared sensors Sx and Sy have detected the block of the infrared rays.

SUMMARY OF THE INVENTION

However, with the method shown in FIG. 10, the detection accuracy depends on the gaps between the infrared rays irradiation means Lx and Ly, and the infrared sensors Sx and Sy that are arranged in the x direction and y direction as shown in the figure. For this reason, the increased number of infrared rays irradiation means Lx and Ly, and infrared sensors Sx and Sy are needed should the detection accuracy be improved. Furthermore, because it is necessary to set the infrared rays irradiation means Lx and Ly, and the infrared sensors Sx and Sy such that they face each other accurately, the setting will be more difficult as they increase in number.

When the gaps between the infrared rays are narrowed in an attempt to improve the detection accuracy until the gaps become narrower than the diameter of the ball, one ball may be detected by a plurality of infrared sensors in the x direction and/or y direction. In this case, one ball may possibly be recognized as a plurality of balls in error.

In addition, when a plurality of balls pass through the net of infrared rays, it is difficult to detect the passing position of each ball with the method shown in FIG. 10. For example, we assume that two balls have passed through position P1 (x1, y1) and P2 (x2, y2), respectively. The infrared sensors at positions corresponding to x1 and x2 detect the block of the infrared rays. Likewise, the infrared sensors at positions corresponding to y1 and y2 detect the block of the infrared rays. However, this alone cannot specify the combination between x1, x2 and y1, y2. In other words, whether the two balls have passed through position P1 (x1, y1) and P2 (x2, y2), or P3 (x1, y2) and P4 (x2, y1) cannot be determined.

An object of the present invention is to accurately detect a position of an object on a given plane in a space irrespective of the number of objects.

In order to solve the aforementioned problems, a first aspect of the present invention provides a position detection system comprising the following units.

an infrared screen generation unit for generating a planar infrared screen;

a reflected light detection unit for selectively detecting a reflection of infrared rays on the infrared screen caused by a given object to be detected that passes through the infrared screen; and     a position specifying unit for specifying a reflection position of the infrared rays that is detected by the reflected light detection unit.

In this position detection system, a position of reflected light is specified by selectively detecting only the reflected light on the infrared screen. Even when a plurality of objects to be detected simultaneously pass through the infrared screen, a position on the infrared screen at which each object to be detected has passed through can be accurately specified without a need of providing a high-precision sensor.

The position detection system may further comprise a real screen provided near and along the infrared screen, and opposite the reflected light detection unit with the infrared screen therebetween.

By setting the infrared screen and the real screen very close to each other, where the object to be detected has hit on the real screen can be specified without a noticeable gap. The real screen is set opposite the reflected light detection means with the infrared screen therebetween. Note that the position detection becomes possible for the whole real screen when the size of infrared screen is big enough to cover the real screen.

A distance between the infrared screen and the real screen is preferably adjusted such that the distance does not exceed a maximum length of the object to be detected.

The distance between the infrared screen and the real screen preferably does not exceed the maximum length of the object to be detected. For example, a case is taken where the object to be detected is a ball. By adjusting the distance between both screens such that it does not exceed the diameter of the ball, re-reflection of the infrared rays caused by the ball that bounces off the real screen can be prevented.

The infrared screen generation unit is preferably arranged at least on a part of a periphery of a given rectangular-shaped plane in a space, and includes a plurality of infrared rays irradiation unit for irradiating the infrared rays having a light axis on the plane.

Each infrared rays irradiation means irradiates the infrared rays having a light axis on the rectangular plane. In other words, an irradiation direction of the infrared rays is included in the rectangular plane. By irradiating the infrared rays having directivity in this way, a planar net of infrared rays, i.e. the infrared screen can be formed. Also, the thickness of the infrared screen can be minimized by irradiating the infrared rays having directivity. The less the thickness of the infrared screen is, the less the distance between the infrared screen and the real screen becomes, thus enabling the position detection near the real screen. Also, because the emitting time of reflected light can be made shorter, even when a plurality of objects to be detected pass through the infrared screen simultaneously, a gap between a position at which each object to be detected hits on the real screen and the timing that it hits thereon can be made smaller.

The plurality of infrared rays irradiation unit are preferably arranged along at least two sides of four sides that form the rectangular-shaped plane.

The infrared rays irradiation means may be arranged along two sides that face each other, or along two sides that are perpendicular to each other. With this configuration, a rectangular-shaped infrared screen can be formed. The infrared rays are irradiated on an object to be detected that passes through the infrared screen at least from two directions. Therefore, even when a plurality of objects to be detected pass through the screen simultaneously, it is less likely that one object to be detected creates a shadow for another object to be detected, thus the infrared rays can be irradiated evenly on all the plurality of objects to be detected.

The position detection system may further comprise a game execution unit for executing a given game. It is preferable that the real screen is connected to the game execution unit and is a display for outputting an image from the game execution unit.

In this system, the real screen is connected to the game execution means, and is a display for outputting an image from the computer terminal.

The position detection system of Invention 1 may be applied to a game. For example, the computer terminal performs the collision detection of a virtual object in a game space displayed on the display with a ball a player throws at the display. The position detection system of Invention 1 may be used for determining a contact position of the ball on the display, which is necessary for the collision detection. Furthermore, even in a case where a plurality of balls hit the display simultaneously, the collision detection of each ball with a virtual object can be performed individually. Thus, the accuracy of the collision detection in a game improves and it can be expected that the game becomes more enjoyable.

The reflected light detection unit preferably includes a first imaging unit and an infrared filter. The first imaging unit repeatedly images at a predetermined time interval, and is set such that at least the whole real screen comes within its angle of view. The infrared filter selects light inputted into the first imaging unit, and is attached to the first imaging unit. The position specifying unit preferably specifies the reflection position of the infrared rays on the infrared screen caused by the object to be detected by analyzing each image imaged by the first imaging unit.

In this system, the position specifying means specifies a reflection position of the infrared rays on the infrared screen caused by the object to be detected by analyzing each image imaged by the first imaging means.

By analyzing the image imaged by the first imaging means such as a camera, an emitting position on the infrared screen can be detected at a predetermined time interval. A CCD camera and video camera and the like may be used as the first imaging means. Note that it is preferable that the first imaging means has a means to correct a distortion of an image which has been imaged. For example, a distortion correction lens such as an aspheric lens may be used. Alternatively, it is possible to correct a distortion of an image using software. Also note that the number of the first imaging means is not necessarily one. For example, when a real screen is big, a plurality of first imaging means may be provided so that the whole real screen comes within the total angle of view of the plurality of first imaging means.

The position detection system may further comprise a second imaging unit and a color specifying unit. The second imaging unit repeatedly images at a predetermined time interval, and is set such that at least the whole real screen comes within its angle of view. The color specifying unit specifies a color of the object to be detected by analyzing each image imaged by the first imaging unit and the second imaging unit.

The color of the object to be detected can be specified by imaging a color image by inputting visible light into the second imaging means and analyzing the color at a position specified based on the image of the first imaging means. For example, in a case where the color of an object to be detected is different for each player in a game played by a plurality of players, it becomes possible to perform the collision detection for each player. Note that the number of the second imaging means is not necessarily one. For example, when a real screen is big, a plurality of second imaging means may be provided so that the whole real screen comes within the total angle of view of the plurality of second imaging means.

The position detection system may further comprise a timing detection unit for detecting timing that reflected light detected by the reflected light detection unit is caused.

For example, it becomes possible to specify the order in which an object to be detected has passed through the infrared screen, which can be advantageously applied to a game.

Another aspect of the present invention provides a position detection method comprising the following steps.

generating a planar infrared screen;

detecting selectively a reflection of infrared rays on the infrared screen caused by a given object to be detected that passes through the infrared screen; and specifying a reflection position of the infrared rays on the infrared ray screen that is detected in the reflected light detection step.

This method is executed in the position detection system in the first aspect of the present invention and demonstrates the same effects as the first aspect of the invention.

By employing the present invention, even when a plurality of objects pass through the infrared screen simultaneously, a position on the infrared screen at which each object has passed through can be specified.

These and other objects, features, aspects and advantages of the present invention will become apparent to those skilled in the art from the following detailed description, which, taken in conjunction with the annexed drawings, discloses a preferred embodiment of the present invention.

DETAILED DESCRIPTION OF THE PREFERRED EMBODIMENTS

Outline of the Invention

In the present invention, a position of reflected light of an object passing through an infrared screen is specified by analyzing an image obtained by selectively imaging the infrared light. When the infrared screen is formed in front of a real screen, for example, a display, reflected light is only caused just in front of the display. Here, when the infrared light is selectively imaged, an image displayed with visible light and reflected light in the infrared region are separated, thereby only reflected light can be imaged. Location of the imaged reflected light on the display can be specified by a publicly known image analysis technique.

This method can be applied to a game machine. A game machine that executes a given game and a display are connected, and an image from the game machine is outputted to the display. The game machine performs the collision detection, for example, of a virtual object in a game space displayed on the display with a ball that a player throws at the display. The aforementioned method may be employed for detecting a contact position of the ball on the display. Even when a plurality of balls hit the display, the collision detection of each ball with a virtual object can be performed individually. Thus, the accuracy of the collision detection in the game improves and it can be expected that the game becomes more enjoyable.

First Embodiment (1) Configuration (1-1) System Outline

Figure 1:
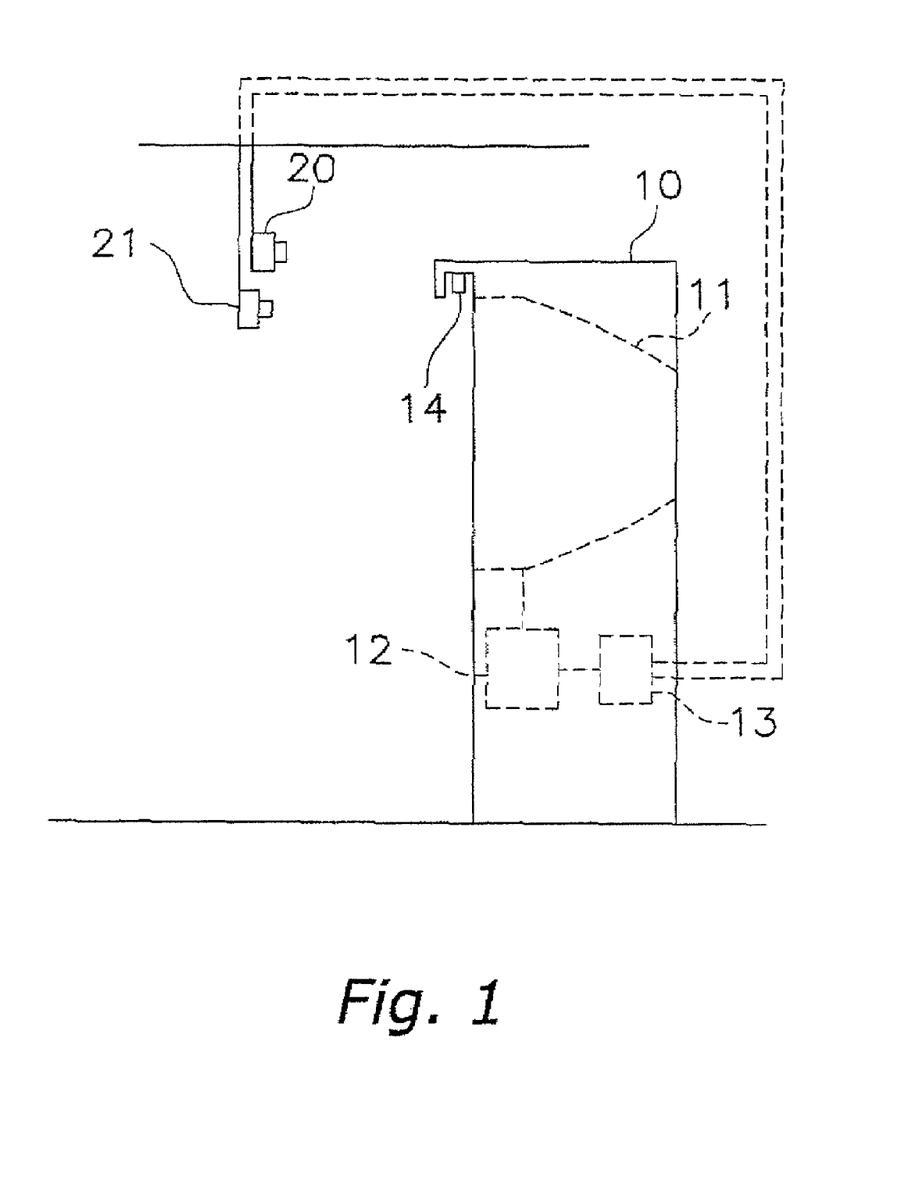
FIG. 1 is an external configuration view of a position detection system according to a first embodiment.

FIG. 1 is an external configuration view of a position detection system according to a first embodiment. The position detection system includes a game case 10, an infrared ray camera 20 provided at the upper front of the game case 10 (corresponding to a part of a reflected light detection means) and a color camera 21. Hereinafter, there are cases where the infrared camera 20 and the color camera 21 are collectively described as cameras 20 and 21.

The game case 10 has the following elements.

(a) Display 11 (corresponding to a real screen): A display 11 is provided at the upper center of the case and outputs an image from a game machine that will be explained later.

(b) Game machine 12: A game machine 12 executes a given game and outputs an image of the game that is being executed to the display 11. In the present embodiment, the game machine 12 executes a game in which a player throws a ball (corresponding to an object to be detected) at and hits a virtual object displayed on the display 11.

(c) Image analysis board 13 (corresponding to a part of a position specifying means and a color specifying means): A image analysis board 13 is connected to the infrared camera 20 and the color camera 21, and analyzes images imaged by both cameras. Specifically, a position of reflected light caused by the ball is specified based on the image from the infrared camera 20, and the color at the specified position is specified based on the image from the color camera 21.

(d) Infrared ray lamp 14 (an infrared screen generation means): A plurality of infrared lamps 14 are provided just in front of the display 11, and irradiate the infrared rays along and all over the display 11. In this way, a planar net of infrared rays (infrared screen) is formed just in front of the display 11.

The infrared camera 20 is set such that at least the whole display 11 comes within its angle of view and inputs images, which are continuously imaged or repeatedly imaged at a predetermined time interval $\Delta T1$, into the image analysis board 13. The time interval $\Delta T1$ may be more than a time interval $\Delta T2$ at which an image of the display 11 is updated ($\Delta T1 \geqq \Delta T2$). The infrared camera 20 includes a camera (corresponding to a first imaging means) and an infrared filter (not shown) attached to the camera. Thus, light in the infrared region is selectively inputted to the infrared camera 20. In other words, the infrared camera 20 selectively images the reflected light by the ball that has passed through the infrared screen. A camera that only detects the infrared light may be used as the infrared camera 20 instead of using the infrared filter. A CCD camera, video camera, digital camera, etc. may be used as a camera that makes up the infrared camera 20. Note that it is preferable that a means to correct a distortion of an image, that has been imaged, is provided. For example, a distortion correction lens such as an aspheric lens may be used. Alternatively, it is possible to correct a distortion of an image using software.

The color camera 21 (corresponding to a second imaging means) is set such that at least the whole display 11 comes within its angle of view and inputs images, that are continuously imaged or repeatedly imaged at a predetermined time interval $\Delta T1$, into the image analysis board 13. When repeating the imaging at a predetermined time interval, the timing of the imaging is preferably synchronized with that of the infrared camera 20. The aforementioned various cameras may be used as the color camera 21. Also, a filter for blocking out light in the infrared region, for example, a filter for selectively allowing light in the visible light region to pass through, may be attached to the aforementioned camera, and use it as the color camera 21. The color camera 21 with such a filter attached thereto can selectively image an image displayed on the display 11. In an image from the color camera 21, the color of a ball can be determined by analyzing the color at the position that is specified based on the image from the infrared camera 20. For example, when the color of a ball is different for each player in a game played by a plurality of players, it is possible to perform the collision detection for each player.

(1-2) Hardware Configuration of Image Analysis Board and Game Execution Means

Figure 2:
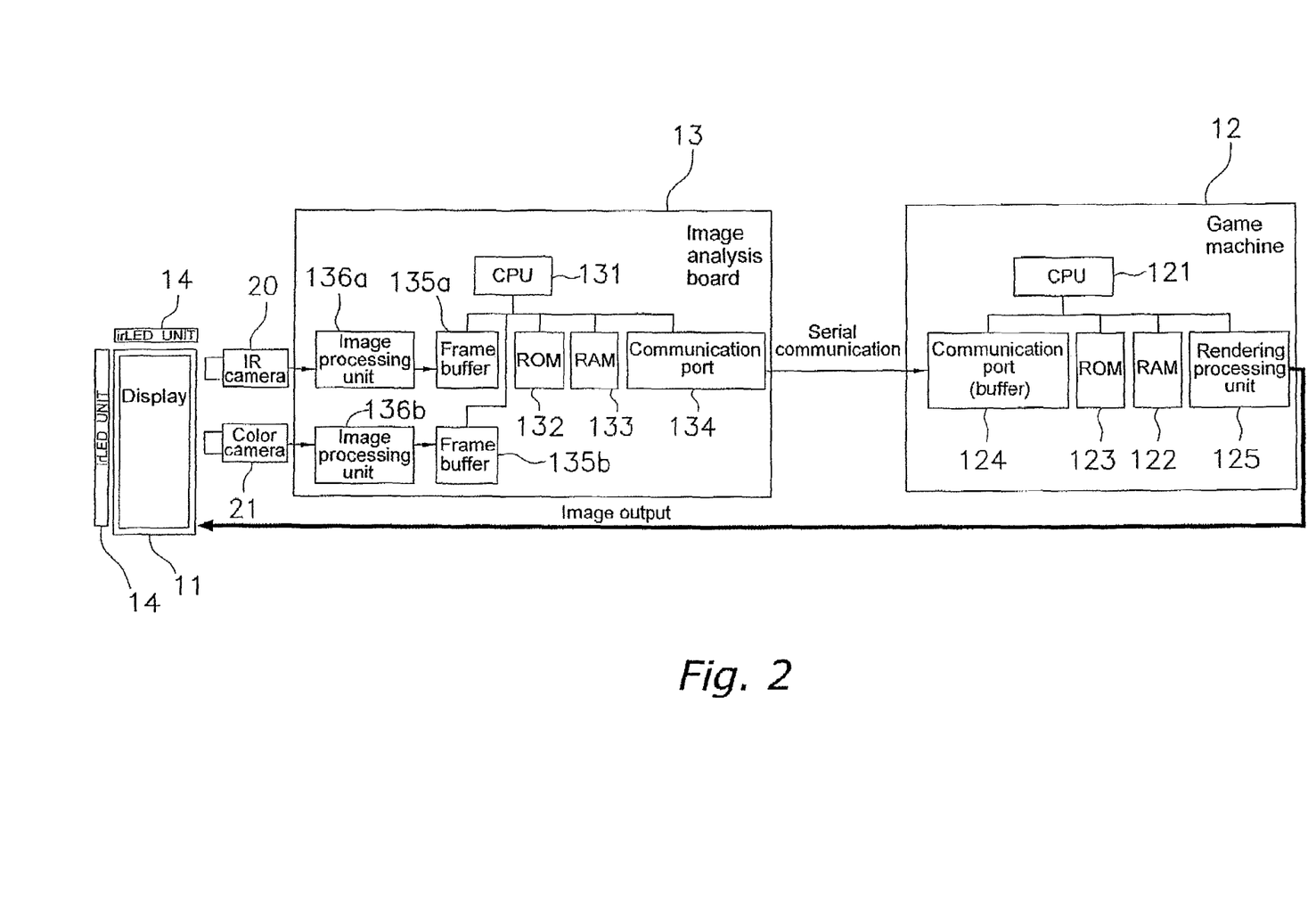
FIG. 2 is an explanatory diagram showing a hardware configuration of an image analysis board and a game machine shown in FIG. 1.

FIG. 2 is an explanatory diagram showing hardware configuration of the image analysis board 13 and the game machine 12 shown in FIG. 1. In the figure, the infrared camera 20 is indicated as IR camera.

The image analysis board 13 has a CPU 131, a ROM 132, a RAM 133, a communication port 134, two frame buffers 135a, b and two image processing units 136a, b.

The image processing units 136a, b convert pictures inputted from the camera 20 and 21 into digital data and develop the data in the frame buffers 135a, b. More specifically, the image processing units 136a, b (1) perform A/D conversion of an inputted picture, (2) generate an address and write the data that was converted into digital data in a memory space that is to be stored in the frame buffers 134a, b, and (3) notify the CPU 131 of the completion of the aforementioned processes (1) and (2) for one frame. An image imaged by the infrared camera 20 is developed in the frame buffer 135a. An image imaged by the color camera 21 is developed in the frame buffer 135b. The CPU 131 reads out an image processing program stored in the ROM 132 and specifies a position of reflected light of a ball based on the image written into the frame buffer 135a while using the RAM 133 as a working area. The CPU 131 specifies color information at the position of reflected light based on the image written into the frame buffer 135b. An image analysis process carried out by the CPU 131 will be explained more in detail later. The CPU 131 writes the specified position information and color information into a buffer 124 of the game machine 12 via the communication port 134.

The game machine 12 has the following elements (a) to (e).

(a) CPU 121: A CPU 121 executes a control program stored in a ROM 123 that will be explained later.

(b) RAM 122: A RAM 122 temporarily stores various variables and parameters.

(c) ROM 123: A ROM 123 stores the control program and various parameters.

(d) Communication port (buffer) 124: A communication port 124 receives and stores data from the image analysis board 13 through a communication cable, for example RS232C.

(e) Rendering processing unit 125: A rendering processing unit 125 generates image data to be displayed on the display 11.

Other than the aforementioned elements, the game machine 12 is connected to a speaker, an audio reproducing unit, an input operation unit and a coin accepting unit (not shown). The speaker outputs sounds while a game is being executed or a demonstration screen is being displayed. The audio reproducing unit generates sound data for the speaker to output. The input operation unit is comprised of a joy stick, operation buttons and the like, and accepts an instruction input from a player. The coin accepting unit accepts a credit by an inserted coin.

The game machine 12 thus configured executes a game in accordance with the control program stored in the ROM 123.

(1-3) Positional Relationship Between Infrared Screen and Display

Figure 3:
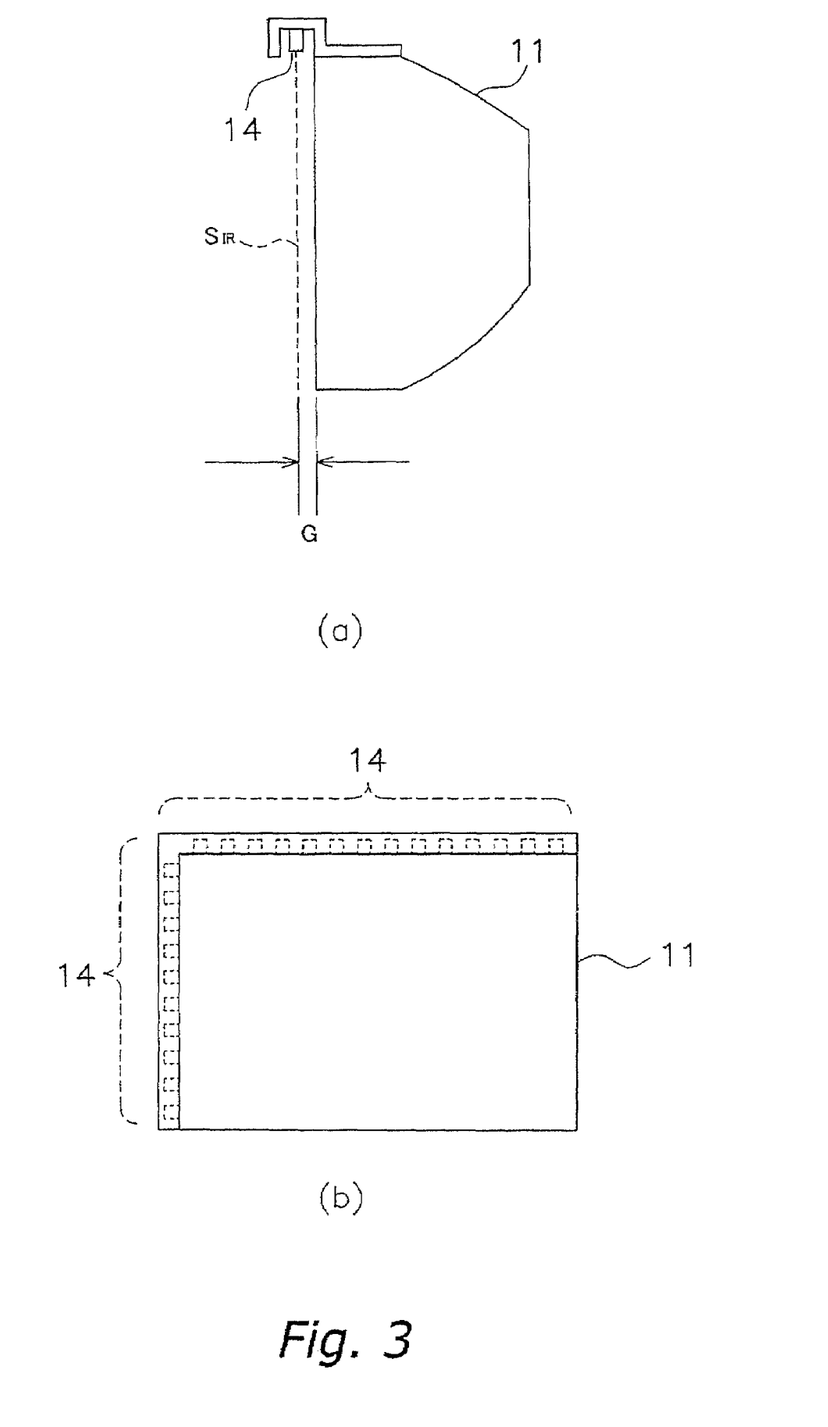
FIG. 3A is an explanatory diagram showing a positional relationship between an infrared screen and a display.
FIG. 3B is an explanatory diagram showing an arrangement example of a plurality of infrared lamps.

FIG. 3A is an explanatory diagram showing a positional relationship between the infrared screen and the display 11. An infrared screen $S_{IR}$ is positioned between the display side of the display 11 and the infrared camera 20. In other words, the display 11 is set opposite the infrared camera 20 with the infrared screen $S_{IR}$ therebetween.

The infrared screen $S_{IR}$ and the display side of the display 11 are preferably positioned close to each other. By positioning the infrared screen $S_{IR}$ and the display side of the display 11 close to each other, it becomes possible to specify where an object has hit on the display side of the display without a noticeable gap. More specifically, by forming the infrared screen $S_{IR}$ just in front of the display side of the display 11, reflection of the infrared rays by the ball is caused just in front of the display. The closer the infrared screen $S_{IR}$ and the display side of the display 11 are, the smaller the difference between the position on the display 11 at which the ball hits and the position of reflection becomes.

More preferably, a distance G between the infrared screen $S_{IR}$ and the display side of the display 11 is adjusted so as not to exceed the maximum length of the ball, i.e. the diameter of the ball. By adjusting the distance between the two in this way, re-reflection of the infrared rays by the ball that bounces off the display side of the display 11 can be prevented.

Furthermore, the infrared screen $S_{IR}$ is preferably the same size as or bigger than the display side of the display 11 and covers the display side. It is because the size of the infrared screen $S_{IR}$ determines an area that can detect the position of the ball. Conversely, another configuration is also possible where the infrared screen $S_{IR}$ is smaller than the display side of the display 11. In this configuration, it is detected that the ball is thrown outside the display 11, and the detection result can be reflected in a game. For example, a penalty such as point reduction may be given to a player if the ball is thrown outside the display 11.

(1-4) Generation of Infrared Screen

FIG. 3B shows an arrangement example of a plurality of infrared lamps 14. The plurality of infrared lamps 14 are arranged at least on a part of the periphery of a given rectangular-shaped plane within a space. In this example, the plurality of infrared lamps 14 are evenly spaced and arranged along the periphery of the rectangular-shaped plane of the display side of the display.

The plurality of infrared lamps 14 irradiate the infrared rays with directivity in the direction along the display side of the display. More specifically, the light axis of the infrared rays irradiated from the infrared lamp 14 is positioned on the rectangular-shaped plane, and the irradiation direction of the infrared rays is included in the rectangular-shaped plane. By giving the infrared rays from the infrared lamp 14 such directivity, the thickness of the infrared screen will be smaller. This enables the gap between the position of reflection caused by the ball passing through the infrared screen and the position on the display that the ball actually hits to be made smaller. As a result, the accuracy of the position detection of the ball will be improved. Furthermore, because the emitting time of reflected light can be made shorter, the gap between the timing that the ball hits the infrared screen and the timing that reflected light is emitted can also be made smaller.

The plurality of infrared lamps 14 are preferably arranged at least along two sides. They may be arranged along two sides that face each other, or along two sides that are perpendicular to each other.

In the aforementioned configuration, the plurality of infrared lamps 14 form the rectangular-shaped infrared screen. The infrared rays are evenly irradiated on the ball passing through this infrared screen at least from two directions. Therefore, even when a plurality of balls pass through the screen simultaneously, it is less likely that one ball creates shadow for another ball, thus the infrared rays can be irradiated evenly on all the plurality of balls.

The interval between the infrared lamps 14 does not necessarily have to be regular, but the intensity of the infrared rays in the infrared screen will be uniform by making the intervals regular.

(2) Specific Example in Game

Figure 4:
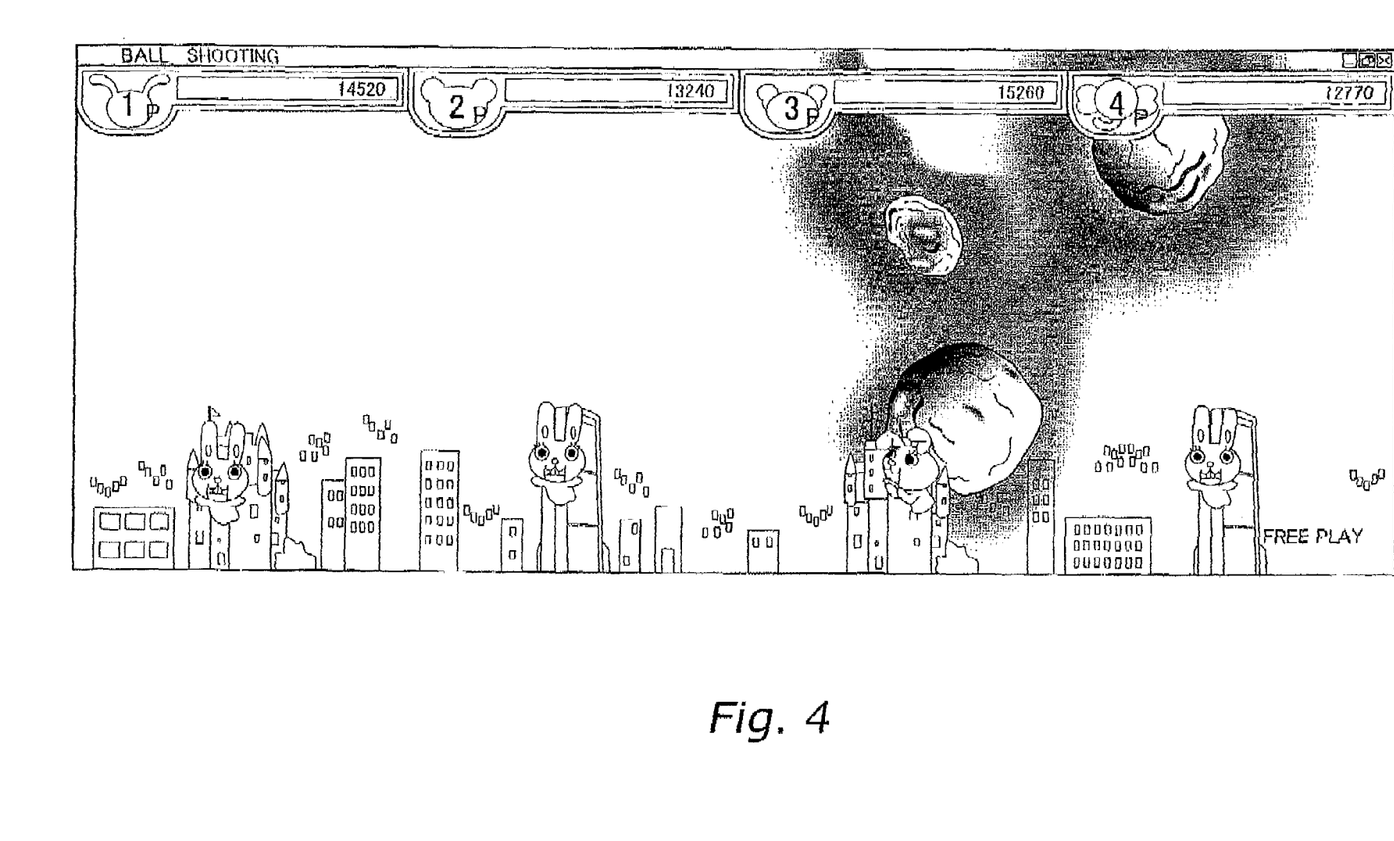
FIG. 4 shows a screen example showing one example of a game executed by the game machine (during the game)
Figure 5:
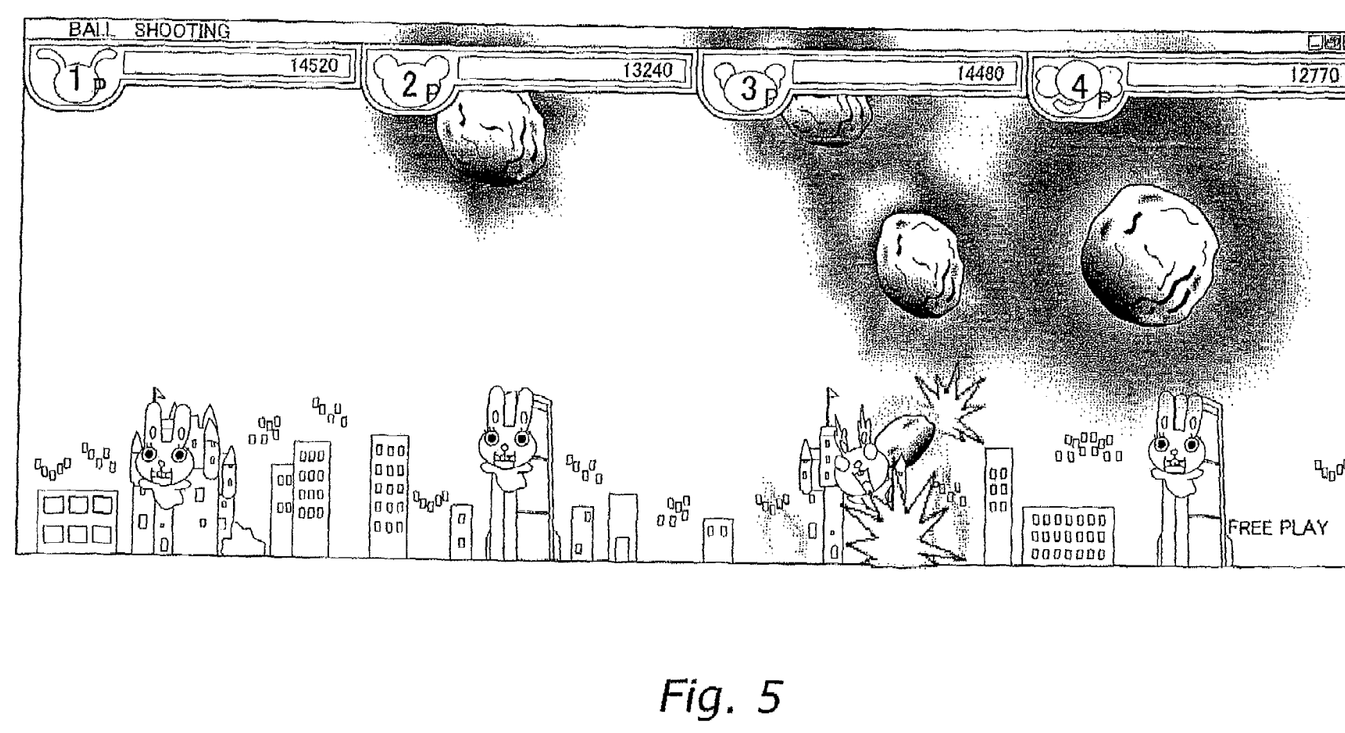
FIG. 5 shows a screen example showing one example of a game executed by the game machine (game over)
Figure 6:
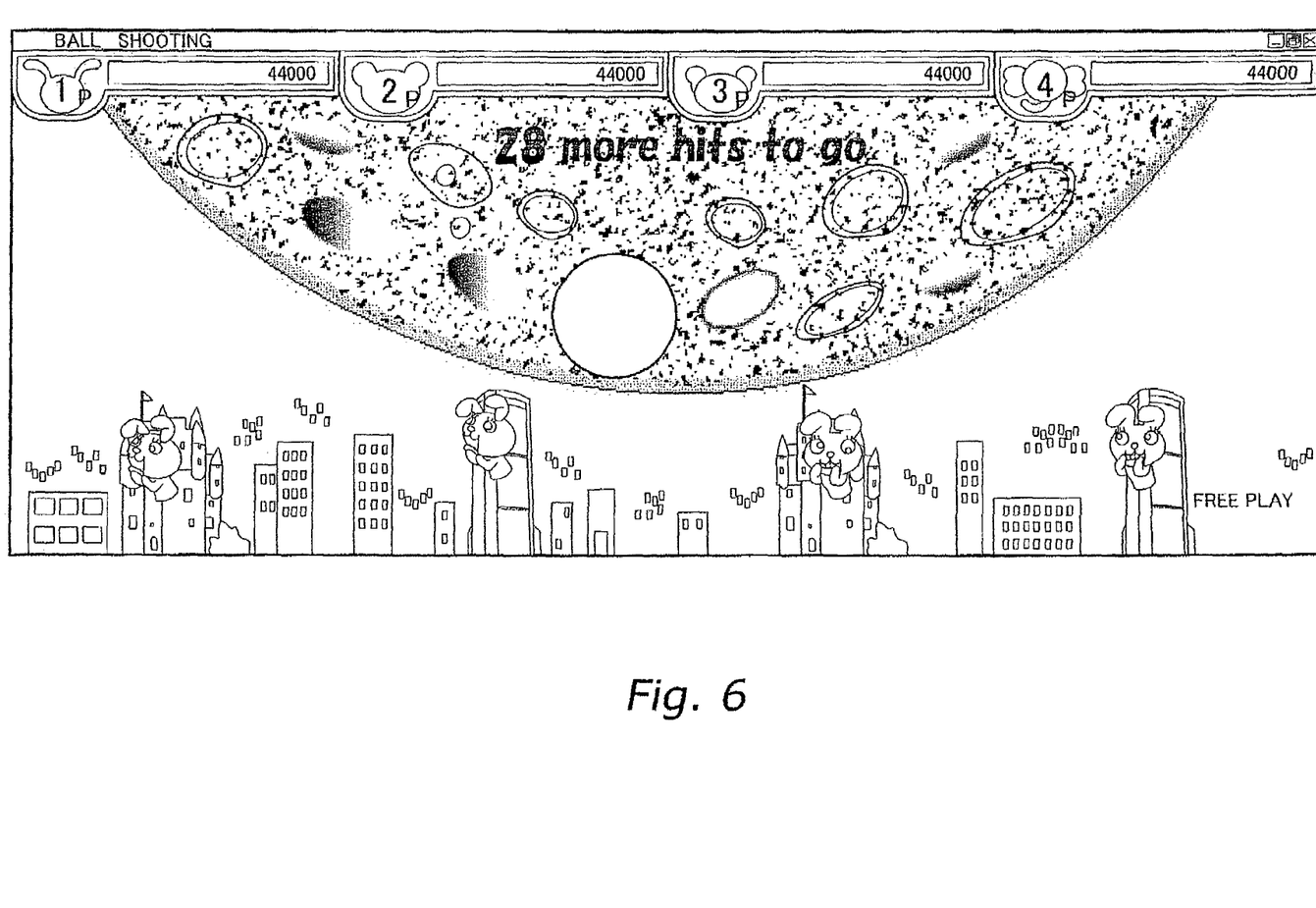
FIG. 6 shows a screen example showing one example of a game executed by the game machine (final phase of the game)

FIGS. 4, 5 and 6 each shows a screen example showing one example of a game executed by the game machine 12. In this game, a player throws a ball at a meteorite that is falling from the sky and destroys it so that it does not hit a building in which a rabbit lives. The remaining lives of the rabbit are indicated in number at a position corresponding to each rabbit in the upper part of the screen. Every time the rabbit is damaged by the meteorite, the remaining lives of the rabbit are reduced. When the meteorite hits the rabbit, the game is over even when the remaining lives are not zero (see FIG. 5). In this example, because there are four rabbits, up to four players can participate in the game to save the rabbits. A gigantic meteorite is falling from above in the final phase of the game, and the player can continue the game if he/she can hit a predetermined number of balls on the gigantic meteorite before it reaches the land (see FIG. 6).

The game machine 12 that executes this game performs the collision detection of the ball with the meteorite based on the position of the ball specified by the image analysis board 13. When it is determined that the ball has hit the meteorite as a result of the collision detection, the meteorite is destroyed.

(3) Process (3-1) Process of Whole System

Figure 7:
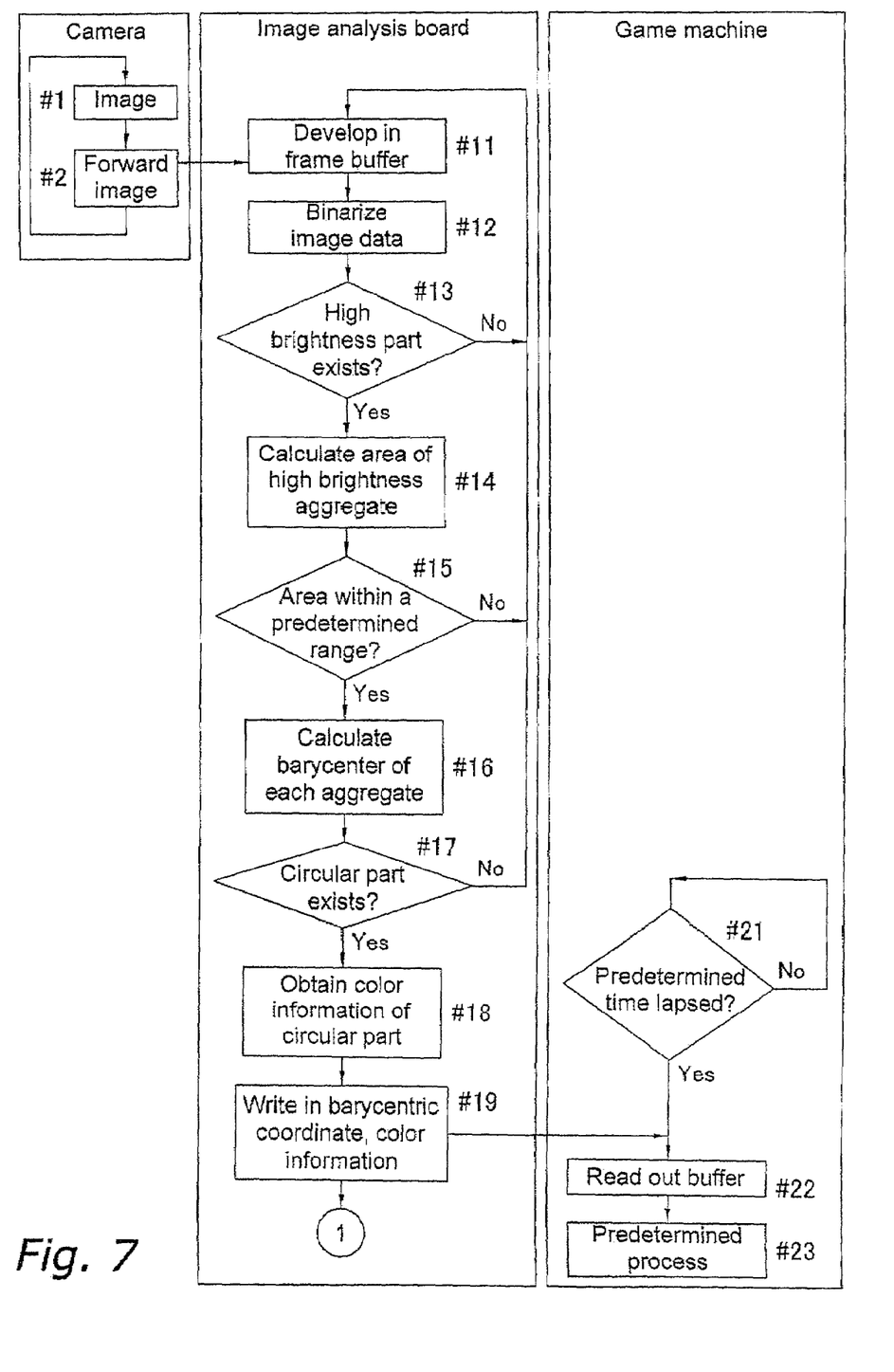
FIG. 7 is an explanatory diagram showing one example of a flow of process performed by a whole position detection system.

FIG. 7 is an explanatory diagram showing one example of a flow of process performed by a whole position detection system. This figure also shows one example of a flow of an image analysis process executed by the image analysis board 13.

First, a process carried out by the infrared camera 20 and the color camera 21 will be explained. Because a process carried out by the infrared camera 20 and the color camera 21 is the same, they will be simply described as cameras 20 and 21 below.

The cameras 20 and 21 continuously perform imaging (#1) and forward a picture signal to the image analysis board 13 (#2).

Next, a process carried out by the image analysis board 13 will be explained. The image processing units 136a, b receive the picture signal from the cameras 20 and 21, convert the picture signal into digital data and develop it in the frame buffers 135a, b (#11).

The CPU 131 binarizes the image data that was developed in the frame buffer 135a on a dot basis based on a predetermined threshold (#12), and select at least one part having a high brightness of the infrared rays on a dot basis (#13). For the selected part having a high brightness, i.e. each aggregate consisting of one or more high brightness dots, the CPU 131 calculates an area of each aggregate (#14). Further, the CPU 131 determines whether or not each of the calculated areas is within a predetermined size (#15), and when there are any aggregates of the high brightness dots having the predetermined size, acquires the barycentric coordinate of each high brightness aggregate (#16). Subsequently, the CPU 131 determines whether or not a degree of circularity of the aggregate whose barycentric coordinate was acquired is within a predetermined range (#17). For example, the aggregate can be determined to be circular when the high brightness dots exist at a predetermined percentage in a circle having a predetermined radius with the acquired barycentric coordinate as the center thereof.

Subsequently, the CPU 131 considers the high brightness aggregate that was determined to be circular as an image of the ball, and converts its barycentric coordinate in the frame buffer 135a into a coordinate in the frame buffer 135b. This coordinate conversion is performed when there is a gap in coordinates between the frame buffer 135a and the frame buffer b. Further, the CPU 131 reads out color information from image data at the coordinate position obtained by the conversion (#18). Thereafter, the CPU 131 writes the barycentric coordinate and the color information of the ball into the buffer 124 of the game machine 12.

Next, a process carried out by the game machine 12 will be explained. The CPU 121 of the game machine 12 refers to the buffer 124 every time the predetermined time ΔT2 has lapsed and reads out the latest position information and color information (#21, #22). The read out information is used for the collision detection in the game (#23). The game machine 12 performs the collision detection in the game using the position information written into the buffer 124 by carrying out this process every 1/60 sec, for example.

(3-2) Process of Game Execution Means

Figure 8:
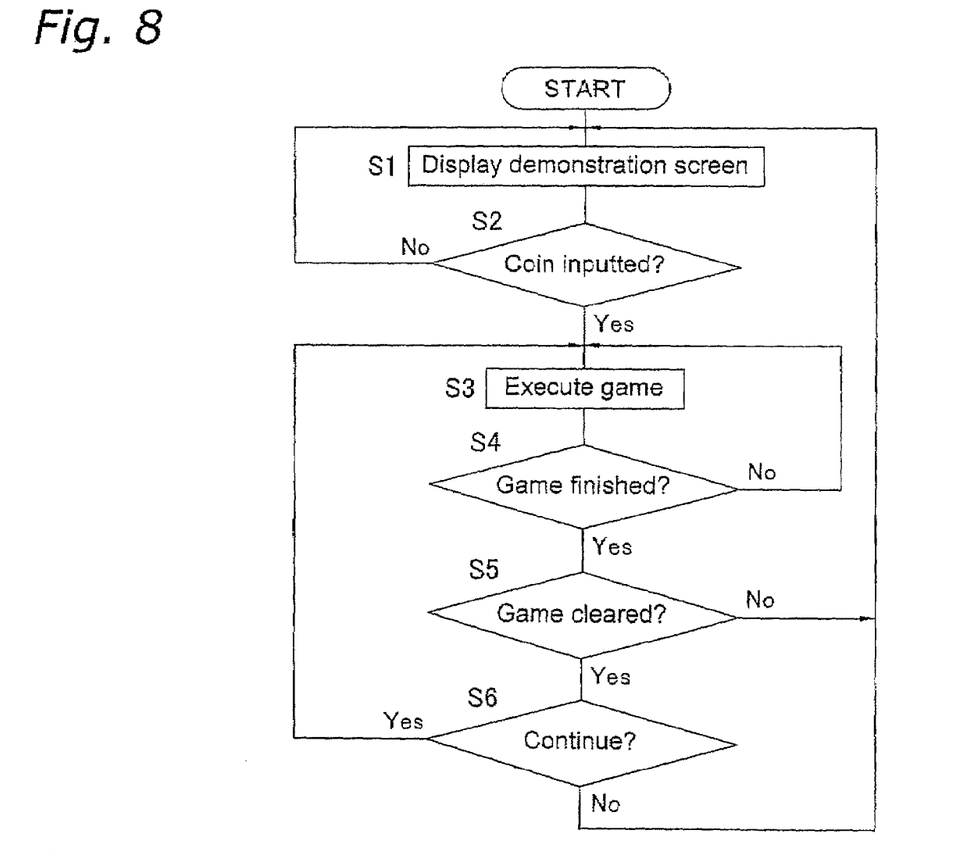
FIG. 8 is a flow chart showing one example of a flow of game process performed by the game machine.

FIG. 8 is a flow chart showing one example of a flow of game process performed by the game machine 12. The CPU 121 of the game machine 12 initiates the following processes when the power is turned on.

Step S1-S2: The CPU 121 waits for a coin to be inserted while outputting a demo screen on the display (S1). When a coin is inserted (S2), a process proceeds to Step S3.

Step S3: The CPU 121 executes a game program stored in the ROM 123. Upon the execution of the game program, the CPU 121 refers to the buffer 124 at necessary timing and uses, at the time of referring, the position information and color information that are written in the buffer 124 for processing a game.

Step S4-S5: The CPU 121 executes the game until the game finishes (S4), and when the game is finished, determines whether the game is finished by clearing the game or by game over (S5).

Step S6: The CPU 121 accepts from the player a selection whether or not he/she wishes to continue the game, and when the game is to be continued, returns to the aforementioned Step 3 and executes a new game. When the game is not to be continued, and when the game is finished by game over in the aforementioned step S4, a process returns to step S1 and display the demo screen.

By employing the present embodiment, where the ball that the player throws at the display has hit thereon during the game can be accurately detected. Moreover, even when a plurality of balls hit the display simultaneously, a position at which each ball hits can be specified. Because reflected light by the ball is caused just in front of the display, a gap between a position at which reflected light is caused and a position at which the ball hits on the display can be minimized. A gap between the timing when reflected light is caused and the timing when the ball hits the display can also be minimized. In this way, even when the collision detection of a virtual object in a game space is performed based on the detection result, no distortion is felt.

Other Embodiments (A) The position detection method of the present invention may be achieved by using light having a wavelength other than that of visible light instead of using infrared light. It is because an image displayed on the display and reflected light of a ball can be separated when light having a wavelength other than that of visible light from a display can selectively be inputted into a camera.

(B) One infrared camera 20 and one color camera 21 are used in the previous embodiment, however, the number of each camera does not necessarily have to be one. For example, in a case where a display is too big to come within the angle of view of one camera, a plurality of infrared cameras 20 and color cameras 21 may be used.

Figure 9:
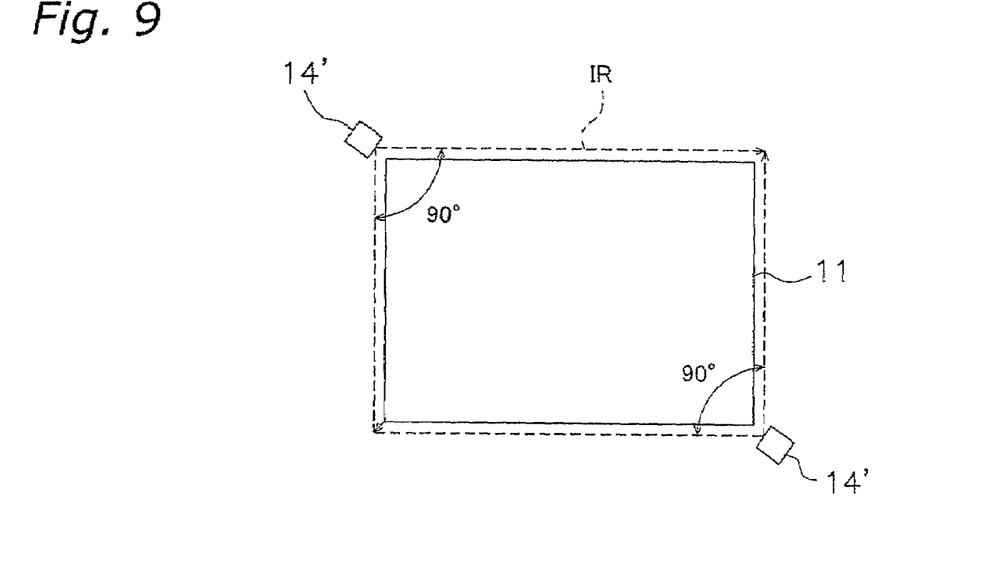
FIG. 9 is an explanatory diagram showing another arrangement example of infrared lamps.

(C) FIG. 9 is an explanatory diagram showing another arrangement example of the infrared lamp 14. An arrangement of the infrared lamp 14 is not limited to the aforementioned example. The infrared lamp 14 may be arranged so that the infrared rays are evenly irradiated to a plurality of objects that pass through the infrared screen. An infrared lamp 14' may be set at least at two corners of a rectangular plane on which the infrared screen is to be formed, the infrared lamp 14' irradiating infrared rays IR having its light axis on the plane within an angle of 90 degrees. When the infrared lamp 14' is set at two corners of a rectangular plane, it is preferable that it is set at two corners diagonally opposite to each other. In this way, it becomes easier to evenly irradiate infrared rays on a ball passing through the infrared screen.

(D) The image analysis board 13 may detect timing that reflected light is caused, for example, time information or a time stamp. In this way, it becomes possible to specify the order in which an object such as a ball has passed through the infrared screen.

By detecting the timing, a trajectory that is created on the infrared screen by an object can also be detected. For example, in a battle game in which a player fights an enemy character by operating a sword, whether or not the player has made a specific movement pattern using the sword, for example a movement in the shape of a cross, can be determined based on the trajectory of the sword on the infrared screen.

(E) The present invention has been explained using a game as an example; however, the present invention can be applied to fields other than the field of games. For example, it may be employed for determining wins or loses in athletics and horse racing. In this case, it is more preferable that the image analysis board 13 detects the timing that has been explained earlier. When the present invention is applied to a game, it can be applied not only to the aforementioned games but also to other various games.

Also, an object to be detected is not limited to a ball but may be an arrow, a BB bullet, a sward-shaped stick or even a part of a player's body. For example, in a fighting game in which a player plays wearing gloves that are coated with paint, a position of the glove may be detected.

(F) A position detection method carried out by the aforementioned position detection system is included in the scope of the present invention. A position specifying method used for the position detection method, a program for executing the method and a computer readable medium on which the program for executing the method is recorded are included in the scope of the present invention. Here, the program includes the one that is recorded on an recording medium and the one that is downloadable. A recording medium includes a computer readable and writable flexible disk, hard disk, semiconductor memory, CD-ROM, DVD, magneto optical disk (MO) and so on.

While only selected embodiments have been chosen to illustrate the present invention, it will be apparent to those skilled in the art from this disclosure that various changes and modifications can be made herein without departing from the scope of the invention defined in depended claims. Furthermore, the detailed descriptions of the embodiments according to the present invention provided for illustration only, and not for the purpose of limiting the invention as defined by the present claims and specifications.

INDUSTRIAL APPLICABILITY

The present invention can be applied to various fields where a position of object in a space is detected, and more preferably, applied to a game field.

What is claimed is:

1. A position detection system, comprising:
   an infrared screen generation unit for generating a planar infrared screen;
   a reflected light detection unit for selectively detecting a reflection of infrared rays on the infrared screen caused by a given object to be detected that passes through the infrared screen; and
   a position specifying unit for specifying a reflection position of the infrared rays that is detected by the reflected light detection unit.

2. The position detection system according to claim 1, further comprising a real screen provided near and along the infrared screen, and opposite the reflected light detection unit with the infrared screen therebetween.

3. The position detection system according to claim 2, wherein a distance between the infrared screen and the real screen is adjusted such that the distance does not exceed a maximum length of the object to be detected.

4. The position detection system according to any one of claim 1, 2 or 3, wherein the infrared screen generation unit is arranged at least on a part of a periphery of a given rectangular-shaped plane in a space, and includes a plurality of infrared rays irradiation unit for irradiating the infrared rays having a light axis on the plane.

5. The position detection system according to claim 4, wherein the plurality of infrared rays irradiation unit are arranged along at least two sides of four sides that form the rectangular-shaped plane.

6. The position detection system according to any of claim 1, further comprising a game execution unit for executing a given game; wherein the real screen is connected to the game execution unit and is a display for outputting an image from the game execution unit.

7. The position detection system according to any of claim 1, wherein the reflected light detection unit includes
   a first imaging unit for repeatedly imaging at a predetermined time interval, the first imaging unit being set such that at least the whole real screen comes within its angle of view, and
   an infrared filter for selecting light inputted into the first imaging unit, the infrared filter being attached to the first imaging unit, and
   the position specifying unit specifies the reflection position of the infrared rays on the infrared screen caused by the object to be detected by analyzing each image imaged by the first imaging unit.

8. The position detection system according to claim 7, further comprising:
   a second imaging unit for repeatedly imaging at a predetermined time interval, the second imaging unit being set such that at least the whole real screen comes within its angle of view; and
   a color specifying unit for specifying a color of the object to be detected by analyzing each image imaged by the first imaging unit and the second imaging unit.

9. The position detection system according to any of claim 1, further comprising a timing detection unit for detecting timing that reflected light detected by the reflected light detection unit is caused.

10. A position detection method comprising the steps of:
    generating a planar infrared screen;
    detecting selectively a reflection of infrared rays on the infrared screen caused by a given object to be detected that passes through the infrared screen; and
    specifying a reflection position of the infrared rays on the infrared ray screen that is detected in the reflected light detection step.

* * * * *